June 2, 1942.    G. WALTHER ET AL    2,285,241
BRAKE
Filed March 28, 1941    4 Sheets-Sheet 1
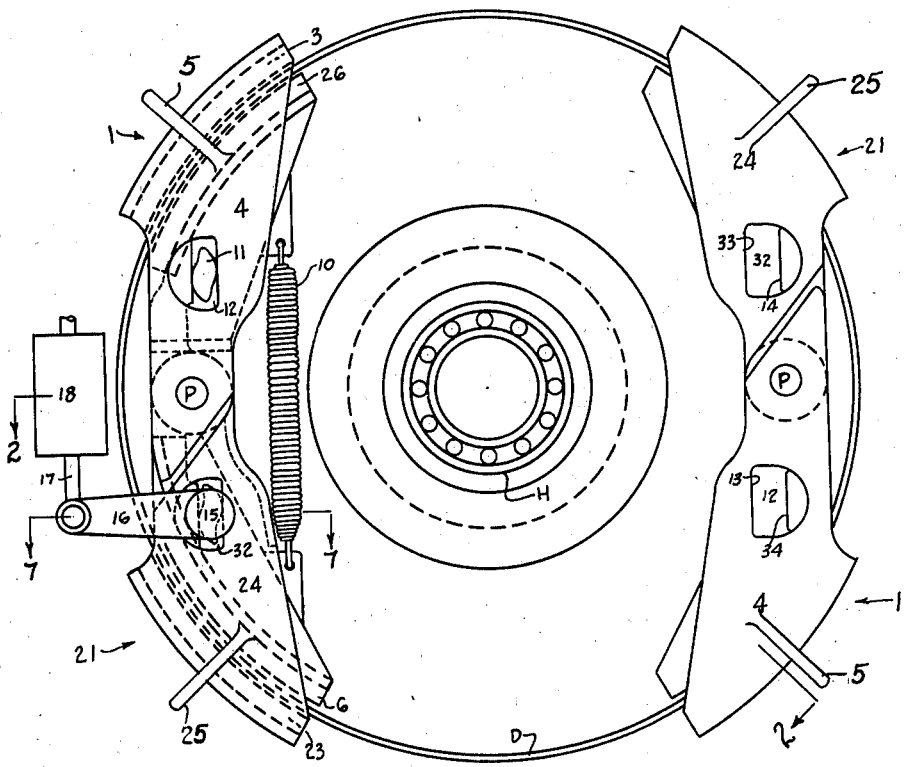
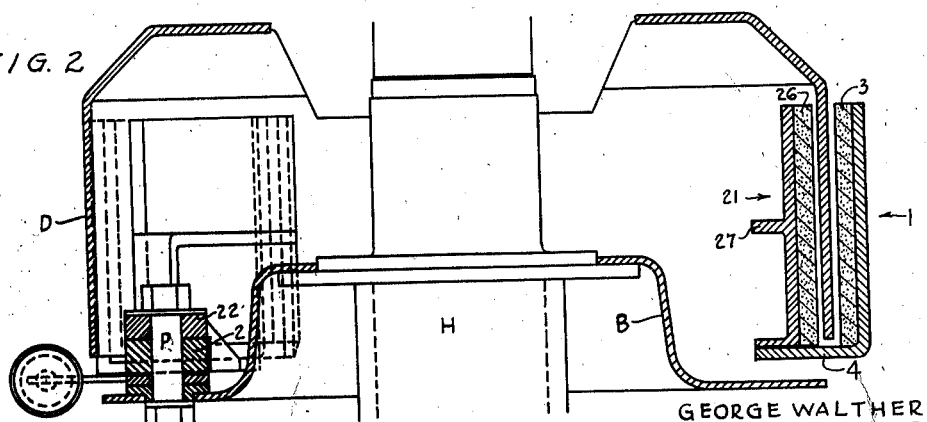
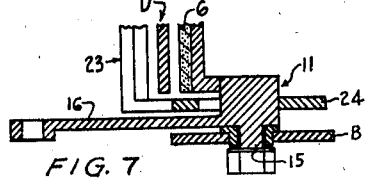
GEORGE WALTHER
CLAUDE W. LESLIE
INVENTORS
BY Arthur H Robert
ATTORNEY.

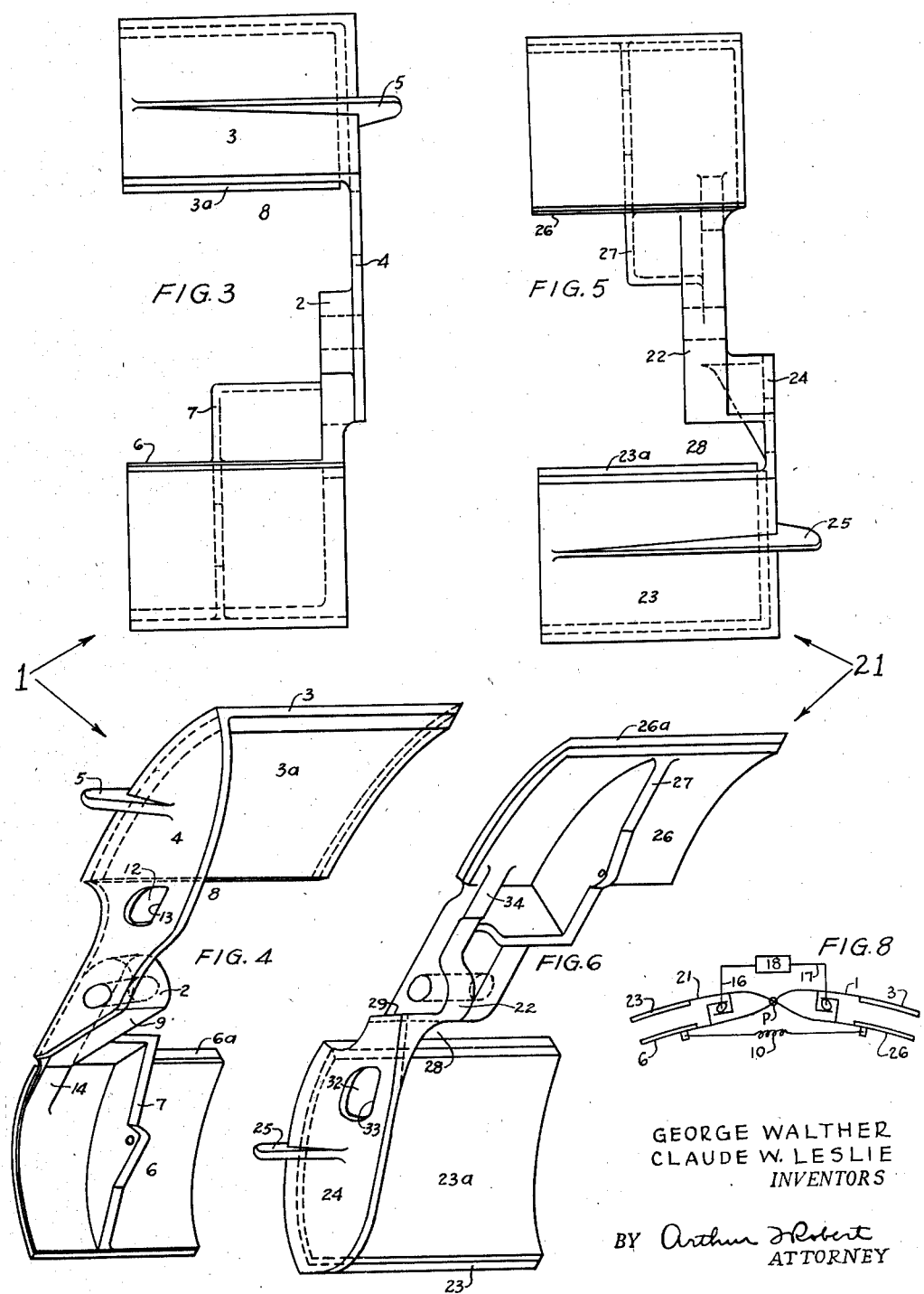

June 2, 1942.                G. WALTHER ET AL                2,285,241
                                  BRAKE
                         Filed March 28, 1941          4 Sheets-Sheet 3

GEORGE WALTHER
CLAUDE W. LESLIE
                INVENTORS

BY Arthur H. Robert
              ATTORNEY

Patented June 2, 1942

2,285,241

UNITED STATES PATENT OFFICE 2,285,241

BRAKE

George Walther and Claude W. Leslie, Dayton, Ohio, assignors to The Dayton Steel Foundry Company, Dayton, Ohio, a corporation of Ohio Application March 28, 1941, Serial No. 385,738

10 Claims. (Cl. 188—76)

It has been proposed in the Berly et al. Patent #693,776, the Rosenberg Patent #1,646,932, and the Bendix Patent #1,936,569 to arrange separate brake-shoe members on the outer and inner sides respectively of a brake drum. It has also been proposed in the Gerling Patent #1,847,828 to arrange a pair of brake levers along diametrically opposed sections of the drum, pivot each lever at its center to a fixed support and provide each lever with "right" and "left" shoes respectively overlying the inner and outer surfaces of the drum. In the Gerling patent, the inner brake shoe of each lever points in the same direction, necessarily resulting in one inner shoe being positioned diametrically opposite the other.

The Hoppenstand Patent #2,201,293 modifies the Gerling arrangement by reversing, on one lever only, the direction in which both shoes point so as to bring the inner shoes, of both levers, adjacent each other, whereby a brake-operating mechanism, such as an operating cylinder, may be interposed between and connected to the adjacent inner shoe. The present invention relates to improvements in this general type of brake structures and, more particularly, in the specific types shown in the Gerling and Hoppenstand patents.

The principal object of this invention is to provide a brake having underlying and overlying brake shoes which do not distort the drum during operation.

A further object is to provide a simple and effective brake mechanism which firmly grips both sides of the brake drum simultaneously to produce an extremely effective braking action without introducing any tendency toward drum distortion.

An embodiment of the invention is illustrated in the accompanying drawings, wherein:

Figure 1 is an elevational view of a brake mechanism, embodying our invention, as it appears from the open end of the drum, the brake-operating mechanism being partly broken at the left side of the drum and entirely omitted at the right side thereof for the sake of clearness;

Figure 2 is a developed section taken along line 2—2 of Figure 1;

Figure 9:
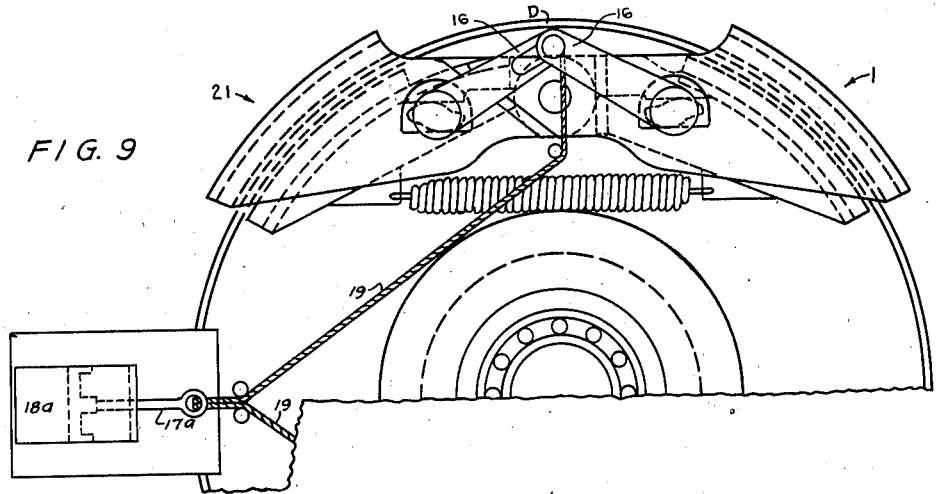
Figure 11:
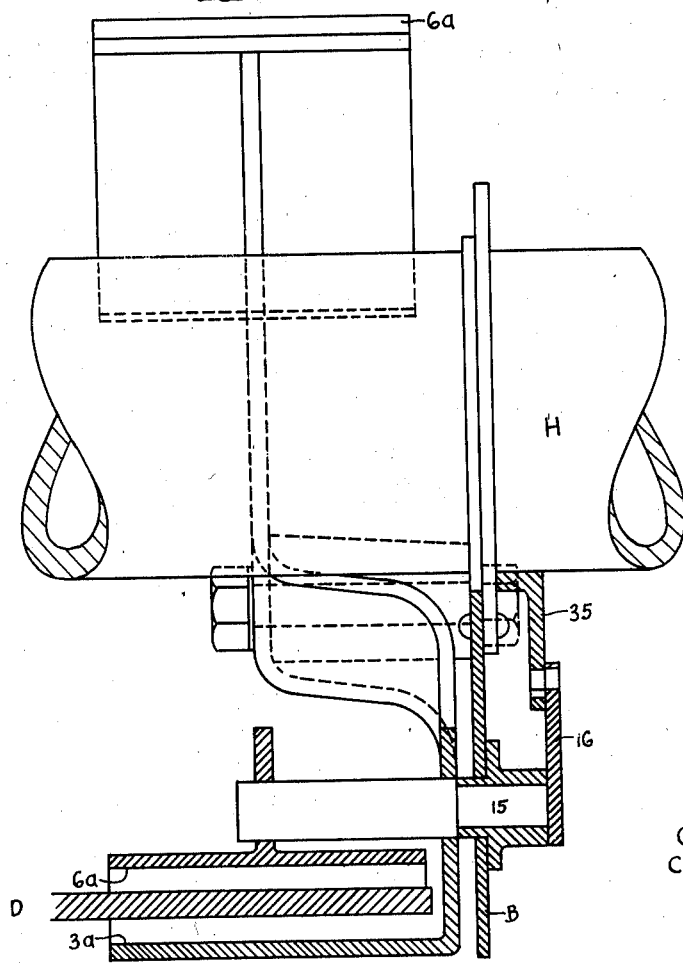
Figure 10:
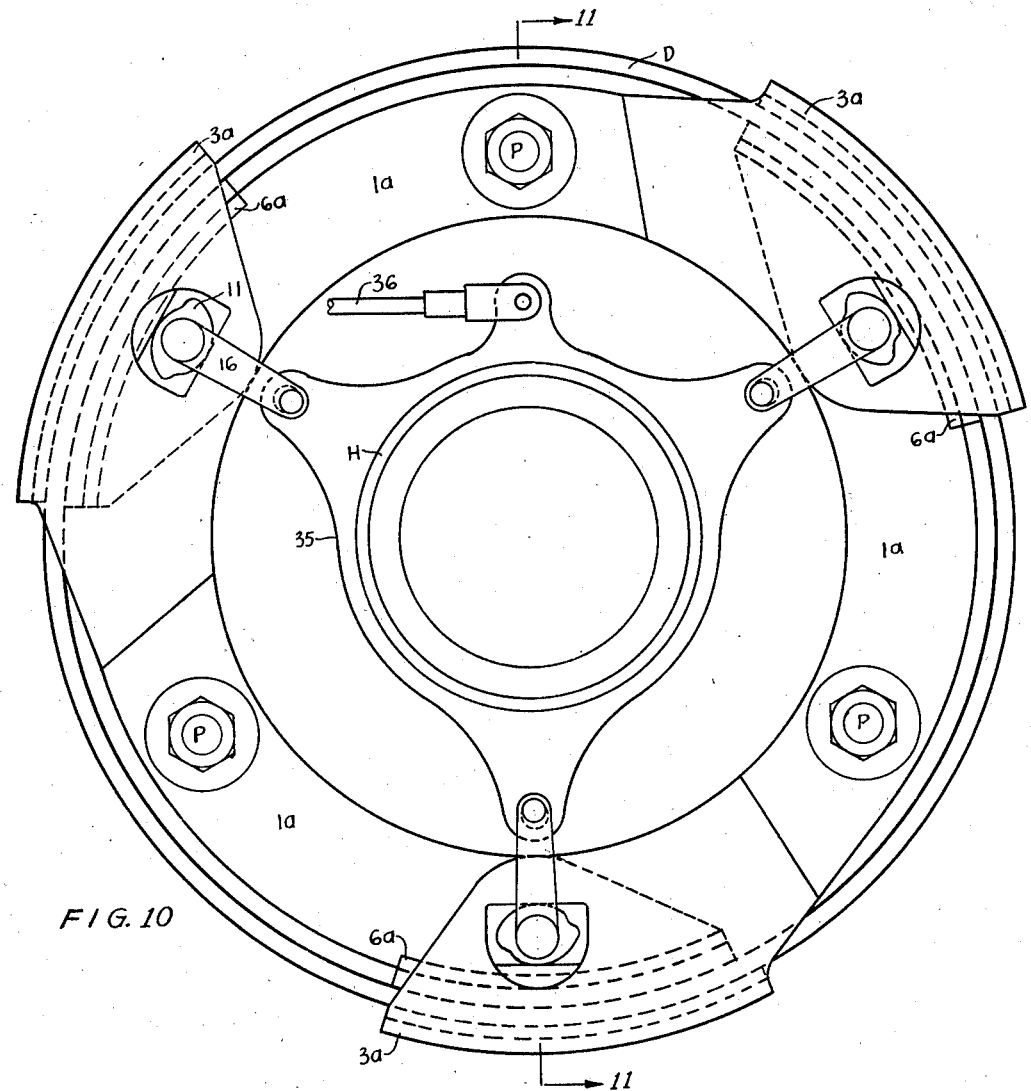

Figures 3 and 4 are plan and perspective views of one brake lever shown in Figures 1 and 2 while Figures 5 and 6 are similar views of the other brake lever;

Figure 7 is a fragmentary section along line 7—7 of Figure 1;

Figure 8 is a schematic view illustrating the manner in which the brake mechanism shown in Figures 1–7, operates;

Figure 9 is a modified form of structure, whereby two brake assemblies arranged on one drum, in accordance with the invention, may be operated from a single operating cylinder;

Figure 10 is an elevational view of another modification embodying the invention; and Figure 11 is a section along 11—11 of Figure 10.

The structure illustrated in Figures 1 through 8 conventionally includes a fixed support, in the form of a stationary housing H and a stationary brake plate B rigidly secured thereto, and a brake drum D fixedly connected to a rotationally mounted wheel not shown. The brake plate B is conventionally provided with at least one fixed pivot P, two such pivots being shown which are located on the plate adjacent peripherally spaced, preferably diametrically opposed, sections of the circle formed by drum D. Following the Gerling and Hoppenstand brake structures, a brake lever is pivotally mounted on one pivot P and provided, adjacent its opposite ends, with shoes respectively overlying the inner and outer surfaces of the drum.

In accordance with our invention, other like brake levers are pivotally mounted on the brake plate B and the inner (and outer) shoes of all levers arranged adjacent, but in opposition to, the outer (and inner) shoes of adjacent levers. For example, with one brake lever on one pivot P, our invention contemplates, and Figures 1 through 8 illustrate, the use of another brake lever pivotally mounted on the same pivot P and provided, adjacent its opposite ends, with shoes reversely overlying the inner and outer surfaces of the drum; that is to say, its outer shoe overlies the drum opposite the inner shoe of the first lever, while its inner shoe overlies the drum opposite the outer shoe of the first lever. In this way, the outer shoe of each lever cooperates with the opposed inner shoe of the other lever to grip the drum between them during the braking operation.

For the sake of brevity and clearness in describing this structure, the end portions of each lever are herein termed inner or outer "shoes," as the case may be, although it will be understood that, while each shoe may provide the actual braking surface, it preferably carries for that purpose a separate brake element which may be removed and replaced from time to time. With this understanding, it may be noted that both lever 1, illustrated in Figures 3 and 4, and lever 21, illustrated in Figures 5 and 6, are respectively provided with: hubs 2 and 22; outer shoes 3 and 23 connected, to their respective hubs, through radially directed side flanges 4 and 24, which are reenforced by outer webs 5 and 25 extending over the outer faces of the outer shoes and flanges; inner shoes 6 and 26, offset axially inward from the radial plane of the side flanges 4 and 24 to provide the space necessary at one side of each inner shoe to accommodate the side flange of the opposed outer shoe, and connected directly to their respective hubs, this connection being reenforced by inner webs 7 and 27 extending from the hub over the inner faces of the shoes 6 and 26; recesses 8 and 28 between the hub and outer shoe through which the corresponding portion of the other lever extends; and inclined surfaces 9 and 29 arranged adjacent the hub of each shoe in position to approach each other when the levers move toward the non-braking position and to retreat from each other as the levers move toward the braking position. The outer shoes 3, 23 and inner shoes 6, 26 respectively carry brake elements 3a, 23a and 6a, 26a.

The levers 1 and 21 are brought into a cooperative relation wherein: the hub 2 is placed on the outer side of hub 22 and aligned therewith; the connection between the hub 2 and the inwardly offset inner shoe 6 is directed through the recess 28 of lever 21; and the connection between hub 22 and inwardly offset inner shoe 26 is directed through the recess 8 of lever 1. In this relation, the hubs are slipped over the pivot P with the levers in the non-braking position in order to provide a drum receiving space between opposed inner and outer shoes. The brake levers may be held in the non-braking position by any suitable means, such, for example, as a spring 10 extending between and connected to inner webs 7 and 27.

The brakes may be operated to the braking position by any suitable mechanism. In the arrangement shown, a pair of cams 11 is arranged on opposite sides of the pivot P, to extend between levers and to draw the levers toward each other when appropriately rotated. Accordingly, the side flanges 4 and 24 of the outer shoes are provided with recesses 12 and 32 to receive cams 11 and to provide straight surfaces 13 and 33 which engage the inner sides of the cams 11, while the connections, between the hubs of the levers and their respective inner shoes, are provided with straight surfaces 14 and 34 which engage the outer sides of the cams 11. The cams are rotationally mounted on the brake plate B through shafts 15, the outer ends of which are connected through crank levers 16 to the opposed pistons 17 of an operating cylinder 18.

While the operation of the foregoing brake assembly is believed to be clear from the above description, it may be helpful to review the operation in connection with the schematic disclosure of Figure 8. From this disclosure, it will be readily appreciated that the spring 10 operates to pull the outer and inner shoes 3 and 6 on lever 1, and 23 and 26 on lever 21 away from the drum. When the braking fluid in the operating cylinder 18 is placed under pressure, it operates in the well-known manner through pistons 17, crank levers 16 and shafts 15 to rotate the cams 11, the cam at the right of Figure 8 turning clockwise and, at the left, counter-clockwise. The clockwise cam engages cam-surface 13 (in the recess 12 on the outer shoe 3 of lever 1) forcing the outer shoe 3 toward the drum. At the same time, it engages shoulder 34 (on the inner shoe 26 of lever 21) forcing the inner shoe 26 outwardly toward the drum. Simultaneously therewith, the counter-clockwise cam not only engages cam-surface 33 (in the recess 32 on the outer shoe 23 of lever 21) forcing the outer shoe 23 toward the drum but also engages shoulder 14 (on the inner shoe 6 of lever 1) forcing it outwardly toward the drum. In this manner the brakes are applied.

Another brake assembly, identical to the one above described may be mounted on the other pivot P to act on the same drum D. Such assembly is shown at the right of Figure 1, but the operating spring, cams, levers, pistons and cylinder are omitted for the sake of clearness.

Two operating cams 11 are employed in each of the brake assemblies shown in Figure 1 in order to insure positive braking action by each pair of opposed shoes on each side of the pivot P, and also prevent the shoes on one side of the pivot from chattering as might be the case if the corresponding cam or its equivalent were omitted. With brake levers of sufficient rigidity, however, positive braking action may be obtained, and chattering prevented, even though only one cam is employed. In an arrangement of that character, it will be readily appreciated that one cam on each assembly may be connected to the same operating cylinder. In fact, it is possible to operate the brake mechanism of Figure 1 by connecting one cam of each assembly to one operating cylinder, and the other cam, of each assembly, to another operating cylinder.

In Figure 9, an arrangement is disclosed for operating both cams of both assemblies from a single operating cylinder. In this arrangement, the crank levers 16 on one assembly are connected together through a slot-pin connection, the pin of which is connected through cable 19 to piston 17a of cylinder 18a. The other brake assembly, not shown, is similarly connected through a separate cable 19 to the same piston 17a of cylinder 18a. Consequently, when the cylinder 18a is operated to retract piston 17a, the slotted-pin connections on each brake assembly will be pulled inwardly rotating one cam of each assembly clockwise and the other cam counter-clockwise, thereby applying the brakes.

The brake mechanism shown in Figures 1 through 8 is similar to that shown in Figure 9 in that a pair of cooperating brake levers are mounted on each pivot P. This is not an essential feature, however, since cooperating brake levers may be mounted on separate pivots P as shown in Figures 10 and 11. Here, three separate brake levers 1a are respectively mounted on three separate pivots P which are spaced along the drum circle 120° apart. The inner shoe 6a of each brake lever is arranged adjacent, but in opposition to, the outer shoe 3a of one adjacent lever. Where the ends of adjacent levers overlap, they may be operatively connected together in the same manner as heretofore i. e. by means of a cam 11 connected to a crank lever 16. The crank levers 16 may be simply arranged for simultaneous operation by connecting them to a ring 35 which is rotationally mounted on housing H for angular movement from one position in which the brakes are applied to another position in which they are released. The ring 35 may be operated to such positions in any suitable way, as for example, by means of a rod 36 connected through an operating cylinder not shown, or otherwise, to the brake system proper.

The "opposed shoe" arrangement of the present invention has at least two important advantages over the "peripherally spaced shoe" arrangements heretofore proposed. In the first place, it completely avoids any tendency to distort the drum mechanically, which tendency, obviously, is present to a pronounced degree where peripherally spaced shoes are used. Second, it subjects that portion of the drum, which lies between any pair of opposed shoes at any one instant, to approximately equal degrees of generated heat on both its outer and inner sides, and, therefore, to approximately equal surface temperatures. This substantially prevents the establishment of a temperature gradient through the thickness of the drum during its passage between shoes; hence correspondingly avoids the drum-distorting tendency incident to a temperature differential. A large temperature differential, however, is present where one side of the drum, at one point, is subjected to a relatively high surface temperature when the other side, at the same point and at the same time, is not similarly subjected.

Having described our invention, we claim:

1. An improvement in brakes comprising the combination: with a brake lever pivoted on a brake support adjacent a brake drum and provided at opposite ends with shoes respectively overlying and underlying the inner and outer surfaces of said drum, of another brake lever pivotally mounted on said support adjacent said drum and provided at one end with a shoe arranged adjacent, but in opposition to, one shoe of the first lever; and means for operating said adjacent shoes simultaneously into and out of engagement with said drum.

2. An improvement in brakes comprising the combination: with a brake lever pivoted on a brake support adjacent a brake drum and provided at opposite ends with shoes respectively underlying and overlying the inner and outer surfaces of said drum, of another brake lever pivotally mounted on said support and provided at opposite ends with underlying and overlying shoes, the underlying shoe of one lever and the overlying shoe of the other lever being arranged in opposition to each other along the same section of the drum circle; and means for operating opposed shoes simultaneously into and out of engagement with the drum.

3. The improvement defined in claim 2 wherein both levers are pivoted for movement about the same axis with the inner shoe of each lever in opposition to the outer shoe of the other lever.

4. The improvement defined in claim 2 wherein the levers extend progressively along the drum and are mounted on different axes with the underlying shoe of one lever in opposition to the overlying shoe of the next adjacent lever.

5. The improvement defined in claim 2 wherein the operating means includes cam surfaces arranged for movement into engagement with brake lever surfaces simultaneously to force the underlying shoes outwardly, and the overlying shoes inwardly, toward the drum to apply the brakes.

6. The improvement defined in claim 2 wherein the operating means includes cams spaced from opposite sides of the pivot of each lever and arranged to engage adjacent portions of separate levers simultaneously to force the underlying shoes outwardly, and the overlying shoes inwardly, toward the drum to apply the brakes.

7. A brake mechanism for brake drums arranged adjacent a brake support comprising: a pair of brake levers pivoted to said support adjacent said drum for movement about the same axis between braking and non-braking position, each lever being provided at opposite ends with inner and outer shoes respectively underlying and overlying the inner and outer surfaces of said drum, the inner shoe of each lever being substantially opposed to the outer shoe of the other lever; and means for operating said levers.

8. The brake mechanism of claim 7 wherein said operating means comprises: means resiliently rotating the two levers toward the non-braking position and cam means operable to force the levers simultaneously toward the braking position.

9. The brake mechanism defined in claim 7 wherein said operating means includes: cams spaced from opposite sides of said pivotal axis and rotationally arranged for engagement with adjacent portions of both levers simultaneously to force the levers toward the braking position when the cams are appropriately rotated; a lever rigidly connected to each cam to rotate therewith; and an operating cylinder to rotate said levers in the brake applying direction.

10. A brake mechanism for a brake drum arranged adjacent a brake support comprising: a series of brake levers extending progressively along the drum and pivoted to said support for movement about separate axes between braking and non-braking positions, each lever being provided at opposite ends with shoes respectively overlying and underlying the inner and outer surfaces of said drum, the overlying shoe of each lever being arranged opposite the underlying shoe of the next adjacent lever; a ring mounted on said support for rotational movement between braking and non-braking positions; means for operating the ring; and means connecting the ring to the adjacent end portions of separate levers to apply and release the brakes simultaneously when the ring is rotated in one direction and the other.

GEORGE WALTHER.
CLAUDE W. LESLIE.